Oct. 30, 1928.
A. MOYNAHAN
SHOPPING BASKET
Filed March 30, 1927
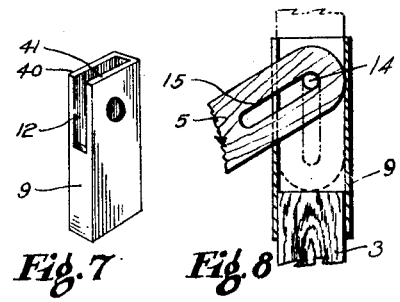
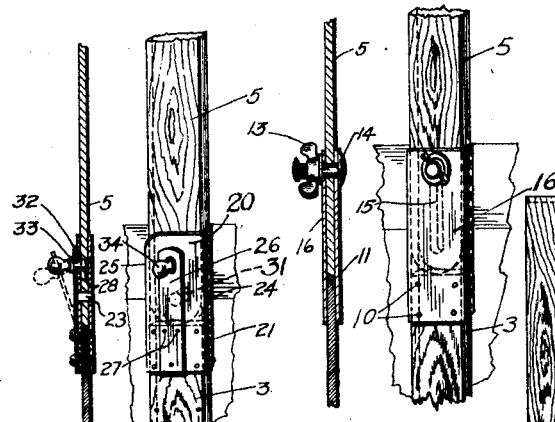
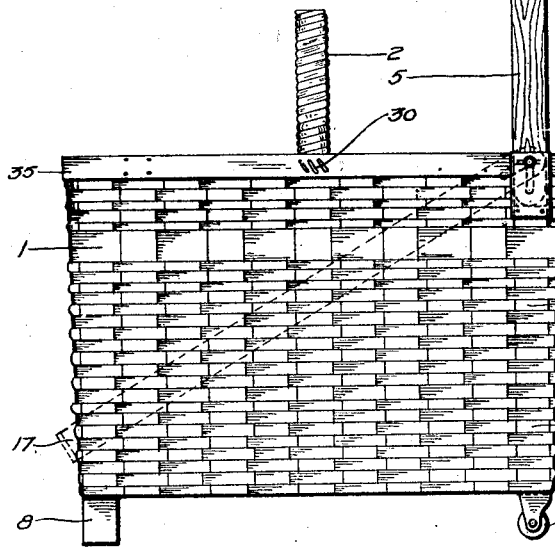
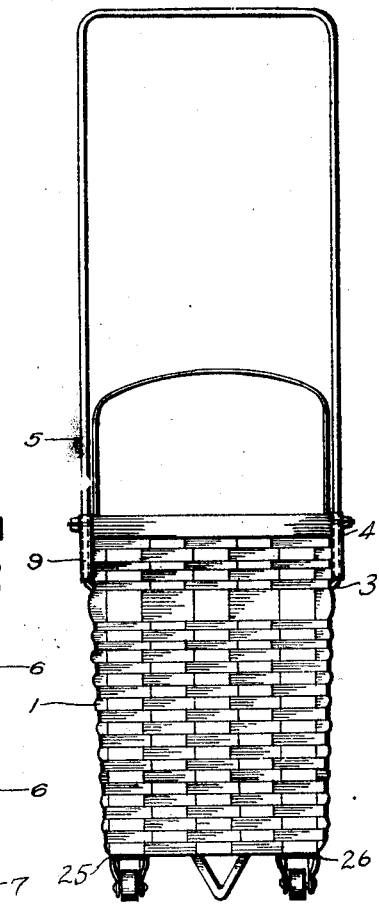
INVENTOR
Anna Moynahan.
BY Frank M. Slough
Her ATTORNEY.

Patented Oct. 30, 1928.

1,689,448

UNITED STATES PATENT OFFICE.

ANNA MOYNAHAN, OF CLEVELAND HEIGHTS, OHIO.

SHOPPING BASKET.

Application filed March 30, 1927. Serial No. 179,430.

My invention relates to improvements in shopping baskets and relates particularly to a basket adapted to be propelled on wheels, casters or the like, or to be carried by a handle provided for the purpose.

An object of my invention is to provide a basket that may be conveniently pushed or pulled as a vehicle or carried as a basket.

Another object of my invention is to provide a basket having a propelling handle which when not in use may be folded out of the way so as not to interfere with the carrying of the basket, loaded or otherwise, in the usual manner of carrying baskets.

Another object of my invention is to provide a basket of the above character, which will be durable in construction, efficient in use, and inexpensive to manufacture.

Other objects of my invention and the invention itself will be better understood by reference to the following description of an embodiment of my invention, and which is illustrated in the accompanying drawings, in which:—

Fig. 1 is a side elevational view of an embodiment of my invention;

Fig. 2 is a rear elevational view of the same;

Figs. 3 and 4 are views illustrating a portion of the basket structure comprising the means for securing a hinge handle element to the basket proper, the view being fragmentary perspective and side elevational sectional, respectively;

Figs. 5 and 6 are views of another embodiment thereof;

Fig. 7 is a perspective view of the sleeve of Fig. 3 before attaching to handle or basket; and Fig. 8 is a diagrammatic view showing operation of handle within sleeve.

Referring now to the different figures of the drawings, Figs. 1 to 4, inclusive, of which illustrate a first embodiment of my invention, and Figs. 5 and 6 of which illustrate a modified form of hinge which may be substituted for the hinge of Fig. 3, like parts being designated throughout by like reference characters, at 1, I show the body of a basket which may be and is herein illustrated as being of the usual form; being formed by weaving therein flat strips of wood or reed material, the said body having an upper reenforced rim 35, the basket being substantially rectangular, although it may be slightly tapered toward the bottom end. The basket, having the usual substantially parallel side walls and substantially parallel end walls and a bottom wall interconnecting the side and end walls, is provided with a carrying handle 2 affixed to the body of the basket in its lateral side walls and to the rim 35 by weaving or otherwise securing the looped handle 2 to the woven side walls and by riveting or otherwise securing the handle side arm portions to the rim 35 as indicated at 30.

Adjacent an end of the basket and secured thereto, preferably by being woven into the basket to form a part thereof, is disposed a heavy strip of material 6 similar to that used in the handle 2. This reinforcement, which is substantially U-shaped, extends preferably across the bottom and up the sides with short upstanding portions 3 disposed outside of and below the upper periphery of the basket on each side, and carries thereon hinges 4 adapted to rotatably support a handle 5 in either an upright or folded position.

At 25 and 26 on the bottom of the basket and supported upon the intermediate horizontal portion of the strip 6, supporting rollers 7 are provided for a purpose later explained. A suitable strip of material which may be such as that of which the handle is constructed is secured to the basket body bottom near the end thereof remote from the strip 6. A portion 8, in the form of a loop, projects downwardly to a distance equal to that of the lower surface of the wheels of the casters 7. This loop provides a short depending leg for the basket adapted to support the front part of the basket and to prevent the basket from moving when resting free or on an incline. It may also be formed by weaving the material into the basket giving additional strength to the basket.

Each hinge portion 4 comprises a sleeve 9 of preferably thin metallic material, the lower part of which encases the strip end portion 3 and is secured thereto by means of screws or rivets 10, the portion 3 extending into the lower part of the sleeve. The upper end wall of the sleeve 9 is formed so as to allow an aperture 12 in the forward end which will allow the handle 5 to reciprocate therein, being held pivotally by the bolt and thumb nut 13 and 14.

At 5, I show an elongated inverted U-shaped handle constructed of a material similar to the material of the handle 2. In the lower portion of the handle 5 is a short elongated slot 15 through which the screw 14 passes with the thumb nut 13 holding the handle securely within the side walls 40 and 41. The medial portion 16 of the sleeve 9 is adapted to act as a socket for the lower end of the handle 5 which when telescoped therein may be secured by tightening the thumb nut 13.

In operation when it is desired to push or pull the basket by the handle 5, the thumb nut 13 is loosened and the lower handle portion telescoped within the medial sleeve portion 16 by means of the slot 15. The thumb nut 13 is then tightened which clamps the side walls 40 and 41 against the upper handle 5 and holds the handle firmly within the sleeve 9. The handle which is thus secured in the sleeve 9 is rigid due to the sleeve extending around the lower portion thereof which prevents any lateral movement.

When it is desired to place the handle in an inoperative position, the thumb nut 13 is loosened and the handle drawn upward removing it from the sleeve, the slot 15 allows the handle to slide upward, the bolt 14, acting as a pivot, allows the handle to drop forward into the position as shown at 17. In this position the basket may conveniently be carried by the handle 2 as any ordinary basket.

In Figs. 5 and 6, I show a sleeve hinge in which the thumb nut is eliminated. At 20, is a sleeve constructed similar to the sleeve of Fig. 3 but which is considerably shorter, being fastened at 21 to the end portion 3 of the reenforcing or supporting strip. The handle 5 is held pivotally within the upper portion of the sleeve by the pin 23 which is fastened to the side walls of the sleeve.

Fastened to the lower side of the sleeve 20 by screws or rivets 27 is a strip of thin flexible material 26 with a transverse lug 31 passing through the free end thereof, the end 32 of the lug 31 being adapted to snap into a recess 28 in the handle 5, which recess is aligned with an aperture 33 in the upper sleeve portion when the handle is in a vertical position. This affords a means of securing the handle in an upright position, the inherent resiliency of the strip 26 retaining the lug end 32 within the aligned apertures. The outer portion 34 of the lug 31 is knob-shaped which furnishes a means of springing the lug from locking engagement with the handle and sleeve.

When it is desired to place the handle in a vehicle propelling position the small knob 34 is grasped and the flexible strip bent outward away from the sleeve which withdraws the lug end 32 from the sleeve and allows the handle to be placed in an upright position. Upon releasing the knob, the flexible strip snaps the lug into the aligned recesses preventing any pivotal movement of the handle within the sleeve.

When it is desired to fold the handle into an inoperative position, the lock is disengaged from the aligned recesses in the handle and sleeve by grasping the knob 34 and bending the flexible strip outwardly. This withdraws the lug 31 and the handle may be folded forward into the position as shown at 17, wherein it engages the lower end wall of the basket.

When the basket is carried by the short carrying handle as in the usual manner of carrying baskets the long handle is folded down to the sides as illustrated in Fig. 1, the rollers being underneath the body of the basket and in no manner contacting or interfering with the person carrying the basket.

Having described my invention in certain embodiments, I am aware that numerous and extensive departures may be made from the embodiments herein illustrated and described, but without departing from the spirit of my invention.

I claim:

1. In a basket receptacle comprising a basket body and an intermediate carrying handle, of a pair of rollers for supporting the basket when used as a vehicle affixed to the underside of the basket, and a propelling substantially inverted U-shaped handle pivoted to the basket adjacent an upper end portion thereof and adapted to be swung to either of two alternative positions, in one of which positions the handle embraces the basket exterior and in the other position the handle is upright and disposed above the basket at an end thereof, and means to secure the handle in the last named position, whereby it may be grasped and adapted to communicate propelling means to the basket when supported on its rollers, said rollers being disposed below the end walls of the basket and within a continuation of the plane of any lateral side wall thereof.

2. In a basket receptacle comprising a basket body and an intermediate carrying handle, of a pair of rollers for supporting the basket when used as a vehicle affixed to the underside of the basket, and a propelling substantially inverted U-shaped handle pivoted to the basket adjacent an upper end portion thereof and adapted to be swung to either of two alternative positions, in one of which positions the handle embraces the basket exterior and in the other position the handle is upright and disposed above the basket at an end thereof, and means to secure the handle in the last named position, whereby it may be grasped and adapted to communicate propelling means to the basket when supported on its rollers, and means to prevent rotation of the handle beyond a given operative propelling position thereof.

In testimony whereof I hereunto affix my signature this 22nd day of March, 1927.

ANNA MOYNAHAN.